Oct. 4, 1927.
D. C. FOWLER
EGG PEELING DEVICE
Filed Feb. 5, 1927
1,644,119
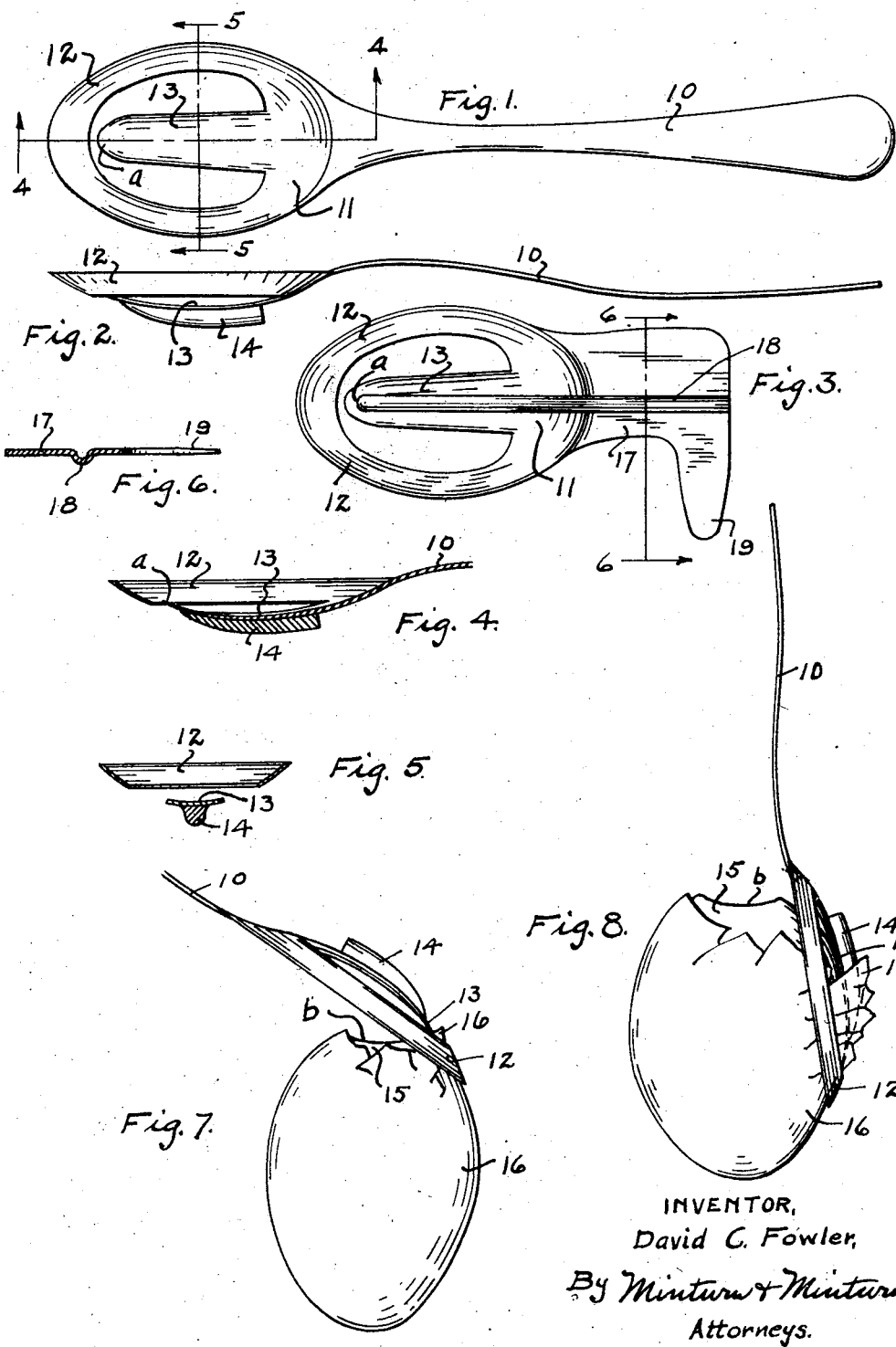
INVENTOR,
David C. Fowler,
By Minturn & Minturn,
Attorneys.

Patented Oct. 4, 1927.

1,644,119

UNITED STATES PATENT OFFICE.

DAVID C. FOWLER, OF MOUNT COMFORT, INDIANA.

EGG-PEELING DEVICE.

Application filed February 5, 1927. Serial No. 166,039.

This invention relates to a device herein termed as an egg peeling device, for removing the shell from boiled eggs, and is described with reference to the accompanying drawing, in which Fig. 1, is a top plan view of the device;
Fig. 2, a side elevation;
Fig. 3, a top plan view of a modified form of the device;
Fig. 4, a longitudinal vertical section on the line 4—4 in Fig. 1;
Fig. 5, a transverse vertical section on the line 5—5 in Fig. 1;
Fig. 6, a transverse vertical section on the line 6—6 in Fig. 3;
Fig. 7, a side elevation of an egg to which the device is being applied; and
Fig. 8, a similar side elevation of an egg with the device shown passed a distance down around from the initial position as shown in Fig. 7.

Like characters of reference indicate like parts throughout the several views.

The device resembles a spoon and has a handle 10 with the integral bowl 11 concave from above. The bowl 11, however is cut away to leave a concave rim 12 around its upper portion and a central tongue 13 extending longitudinally forward to have its front tip $a$ turned upwardly slightly, Fig. 4, to terminate just above and behind the lower edge of the rim 12 to leave a space therebetween of the approximate thickness of an egg shell.

Apart from the slight upturning of the tip $a$, the tongue 13 retains the same curvature of a concave nature as it would have had, had the bowl of the spoon not been cut away on either side of the tongue. The tip $a$ is rounded and sharpened to a knife-like edge.

Projecting from the under side of the tongue 13, is a bead or rib 14 which diminishes in height and curves upwardly forwardly toward the tongue 13, where the under curve meets the tongue and the rib terminates a slight distance back of the end of the tip $a$. The maximum height of the rib 14 is at its rear end which is substantially at the rear end of the tongue 13.

Referring now to Figs. 7 and 8, the egg 15 to be peeled is first tapped on its large end to crack the shell slightly. The air cell of the egg is generally at the large end of the egg so that when the egg is boiled there is a cup-like depression $b$ left under the shell 16. The shell is thus broken over this cup $b$.

The device is then placed over the egg, Fig. 7, with the concave side down on the outer side of the shell 16. The tip $a$ of the tongue 13 is slipped under the broken shell 16, and the device is then pushed on over down and around the shell 16 as in Fig. 8, during which travel, the concave rim 12 serves as a guide by conforming to and sliding over the outer side of the shell, and the tongue 13 having its tip $a$ directed just under the shell, lifts the shell 16 whereby the shell 16 passes out over the tongue 13 and is cracked and severed by the rib 14, thereby being completely removed from the egg proper down along that side. If the shell 16 does not then drop from the egg readily, the device is passed down over the egg to break the shell away again on another side.

The upper side of the tongue 13 being concave does not cut into the white of the egg but slides over the outside of the white just under the shell. The rib 14 very effectively breaks the shell 16 as the device is carried down over the egg, acting as a wedge by breaking the shell upwardly from where it is held downwardly by the rim 12.

In Figs. 3 and 6, is shown a similar egg peeling device having its handle end only changed from the device as above described. In this modified form, the handle 17 is shortened to lie within the palm of the operator's hand, and a rib 18 is provided for a finger tip rest to aid in guiding the device over the egg. A handle tongue 19 is extended laterally from one side of the handle and is sharpened on its outer edge. This tongue 19 may be used as a hammer to break in the shell of the egg preliminary to using the device as above described, and it also may be used to remove quickly any particle of shell remaining after the shell has been broken away by the other end.

I claim:

1. In a device for removing the shell from an egg, a band to contact the shell from the outside, a relatively narrow tongue extending forwardly from one side of the band downwardly away from the band thence curving around and upwardly back toward and terminating within and just behind the forward side of the band to have the tip of the tongue directed just over but behind the edge of the band to enter under the shell, said tongue being curved longitudinally on its top side to conform substantially to the curvature of the inside of the egg shell, and said tongue having on its under side a section dropping downwardly from just behind the tip and curving backwardly whereby the tongue serves as a wedge in breaking the shell outwardly through the bowl.

2. In a device for removing the shell from an egg, a band to contact the shell from the outside, a relatively narrow tongue extending forwardly from one side of the band downwardly away from the band thence curving around and upwardly back toward and terminating within and just behind the forward side of the band to have the tip of the tongue directed just over but behind the edge of the band to enter under the shell, and a wedge rib on the under side of the tongue.

In testimony whereof I affix my signature.

DAVID C. FOWLER.